(12) United States Patent
    Degioanni et al.

(10) Patent No.: US 9,036,493 B2
(45) Date of Patent: *May 19, 2015

(54) MULTILEVEL NETWORK MONITORING SYSTEM ARCHITECTURE

(75) Inventors: Loris Degioanni, Davis, CA (US);
    Steven McCanne, Berkeley, CA (US);
    Christopher J. White, Boston, MA (US); Dmitri S. Vlachos, Lexington, MA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 13/415,815

(22) Filed: Mar. 8, 2012

(65) Prior Publication Data
    US 2013/0064096 A1    Mar. 14, 2013

Related U.S. Application Data

(60) Provisional application No. 61/450,599, filed on Mar. 8, 2011.

(51) Int. Cl.
    *H04L 12/26* (2006.01)
    *H04L 29/08* (2006.01)
    *H04L 29/06* (2006.01)

(52) U.S. Cl.
    CPC ............ *H04L 67/1097* (2013.01); *H04L 63/30* (2013.01); *H04L 43/022* (2013.01); *H04L 43/026* (2013.01); *H04L 43/04* (2013.01); *H04L 43/12* (2013.01); *Y02B 60/33* (2013.01)

(58) Field of Classification Search
    None
    See application file for complete search history.

(56) References Cited

U.S. PATENT DOCUMENTS

| 7,508,768 | B2 * | 3/2009 | Yoon et al. ................... 370/252 |
| 7,949,732 | B1 * | 5/2011 | Roesch et al. ................ 709/220 |
| 8,161,152 | B2 | 4/2012 | Ogielski et al. |
| 8,577,817 | B1 * | 11/2013 | Keralapura et al. ............. 706/13 |
| 2002/0048269 | A1 * | 4/2002 | Hong et al. ................... 370/389 |
| 2004/0103218 | A1 | 5/2004 | Blumrich et al. |

(Continued)

OTHER PUBLICATIONS

ACLU, "Eavesdropping 101: What Can the NSA Do?", 2006.*

*Primary Examiner* — Timothy J Weidner
(74) *Attorney, Agent, or Firm* — Park, Vaughan, Fleming & Dowler LLP

(57) ABSTRACT

Network traffic information from multiple sources, at multiple time scales, and at multiple levels of detail are integrated so that users may more easily identify relevant network information. The network monitoring system stores and manipulates low-level and higher-level network traffic data separately to enable efficient data collection and storage. Packet traffic data is collected, stored, and analyzed at multiple locations. The network monitoring locations communicate summary and aggregate data to central modules, which combine this data to provide an end-to-end description of network traffic at coarser time scales. The network monitoring system enables users to zoom in on high-level, coarse time scale network performance data to one or more lower levels of network performance data at finer time scales. When high-level network performance data of interest is selected, corresponding low-level network performance data is retrieved from the appropriate distributed network monitoring locations to provide additional detailed information.

20 Claims, 7 Drawing Sheets

(56) References Cited

U.S. PATENT DOCUMENTS

| | | |
|---|---|---|
| 2004/0208131 A1* | 10/2004 | Rodriguez et al. ............ 370/252 |
| 2005/0187677 A1* | 8/2005 | Walker ............................ 701/16 |
| 2008/0189350 A1 | 8/2008 | Vasa et al. |
| 2008/0320151 A1 | 12/2008 | McCanne et al. |
| 2011/0153189 A1 | 6/2011 | Chiang et al. |
| 2011/0211473 A1* | 9/2011 | Matityahu et al. ............ 370/252 |
| 2012/0096145 A1* | 4/2012 | Le et al. ........................ 709/224 |
| 2013/0265883 A1* | 10/2013 | Henry et al. .................. 370/241 |

\* cited by examiner

MULTILEVEL NETWORK MONITORING SYSTEM ARCHITECTURE

CROSS-REFERENCE TO RELATED APPLICATIONS

This application is related to U.S. Provisional Patent Appl. No. 61/450,599, filed Mar. 8, 2011, and entitled "Multilevel Network Monitoring," which is incorporated by reference herein for all purposes.

BACKGROUND

The invention relates to the field of computer networks and systems and methods for monitoring, analyzing, and modifying network traffic. There exists a variety of systems, protocols, and software applications for monitoring and analyzing network traffic. These include packet analyzers like Wireshark, traffic load measurement applications like MRTG, network monitoring protocols such as SNMP and netflow, and system logs, reports, and other data records. Each of these things is adapted to monitor a narrow aspect of network performance. Moreover, many of these applications and protocols are tailored to measure network performance at a single location, rather than over multiple network locations. Applications that do monitor network performance at multiple network locations often provide very little information, such as detailed packet traffic data. This requires system administrators to use multiple applications and tools to identify, diagnose, and correct network problems.

Additionally, network performance data can be very large and difficult to efficiently collect, especially for large networks and if packet data (as opposed to just traffic load and network flow data) is included. Moreover, system administrators often need to sift through large quantities of network performance data to identify and diagnose network problems.

SUMMARY

Embodiments of the invention include systems and methods for integrating a variety of network traffic information from multiple sources, at multiple time scales, and at multiple levels of detail to provide users, such as system administrators, with network traffic information in formats that are easier to identify relevant network information. Example time scales include, but are not limited to, individual packet network traffic data on a time scale of milliseconds, microseconds, or nanoseconds; microflows including sequences of packets over a time scale of seconds; flows including sequences of packets over a time scale on the order of minutes; and macroflows including sequences of flows over a time scale on the order of fifteen minutes or bigger.

In an embodiment, the network monitoring system stores and manipulates low-level network packet traffic data and higher-level network microflow, flow, and macroflow information separately to enable efficient scaling of the collection and storage of network performance data. Network packet traffic data is collected, stored, and analyzed at multiple network locations. Low-level packet and microflow traffic data is stored at the collection locations and may be communicated over the network only as needed, conserving network bandwidth.

Instead of communicating all low-level packet and microflow traffic data over the network, an embodiment of the network monitoring system use the distributed network locations to communicate summary and aggregate data identifying network microflow traffic and other attributes of potential interest to central flow collection and analysis modules. The central flow collection and analysis modules combine data received from multiple network locations to provide an end-to-end description of network traffic at coarser time scales, such a network traffic flows and macroflows.

In an embodiment, a network monitoring system provides top-down visibility of network performance data. System administrators or other users can "zoom-in" or "drill down" on high-level network performance data, such as network and application health, to one or more intermediate levels of network performance data, such as network flow statistics and trends, and further to low-level network performance data, such as captured network packets. When a user selects specific high-level network performance data of interest, such as a macroflow or flow, an embodiment of the network monitoring system retrieves corresponding low-level network performance data, such as packet and microflow traffic, from the appropriate distributed network monitoring locations to provide additional detailed information about the area of interest.

In an embodiment, users and network monitoring and control applications may collect and present network performance data from both distributed and centralized sources for presentation, analysis, and control of the network. In a further embodiment, macroflow and flow information may be used to identify the appropriate distributed network devices that have microflow and packet information relevant to network traffic of interest to the user. In an additional embodiment, analytics processing and presentation portions of the system may be programmable and utilize web protocols such as XML/HTTP and REST.

In an embodiment, the network monitoring system may use behavioral analytics to identify network problems. For example, the network monitoring system may learn traffic trends and patterns over time and be configured to identify the existence of a problem when the network traffic deviates significantly from the pattern.

In an embodiment, the network monitoring system includes a database that exploits the time-series structure, typical search patterns on flow tuples, and multilevel hierarchy of network performance data. In a further embodiment, each distributed network monitoring device may store and organize data according to the collection time, such as in packet data block references, and compute microflow information as packets are collected. Microflow information may then be used to accelerate queries of packet data.

In a further embodiment, the network monitoring system may allow for extensions and additional applications through a scripting interface. This can enable features such as UI gadgets, more advanced behavioral analytics, packet dissectors, capture control, reports, system configuration, alarms, network topology applications, and additional packet and flow information. The scripting interface may also enable alarms and behaviors specific to different types of applications and businesses.

BRIEF DESCRIPTION OF THE DRAWINGS

The invention will be described with reference to the drawings, in which.

DETAILED DESCRIPTION

Figure 1A:
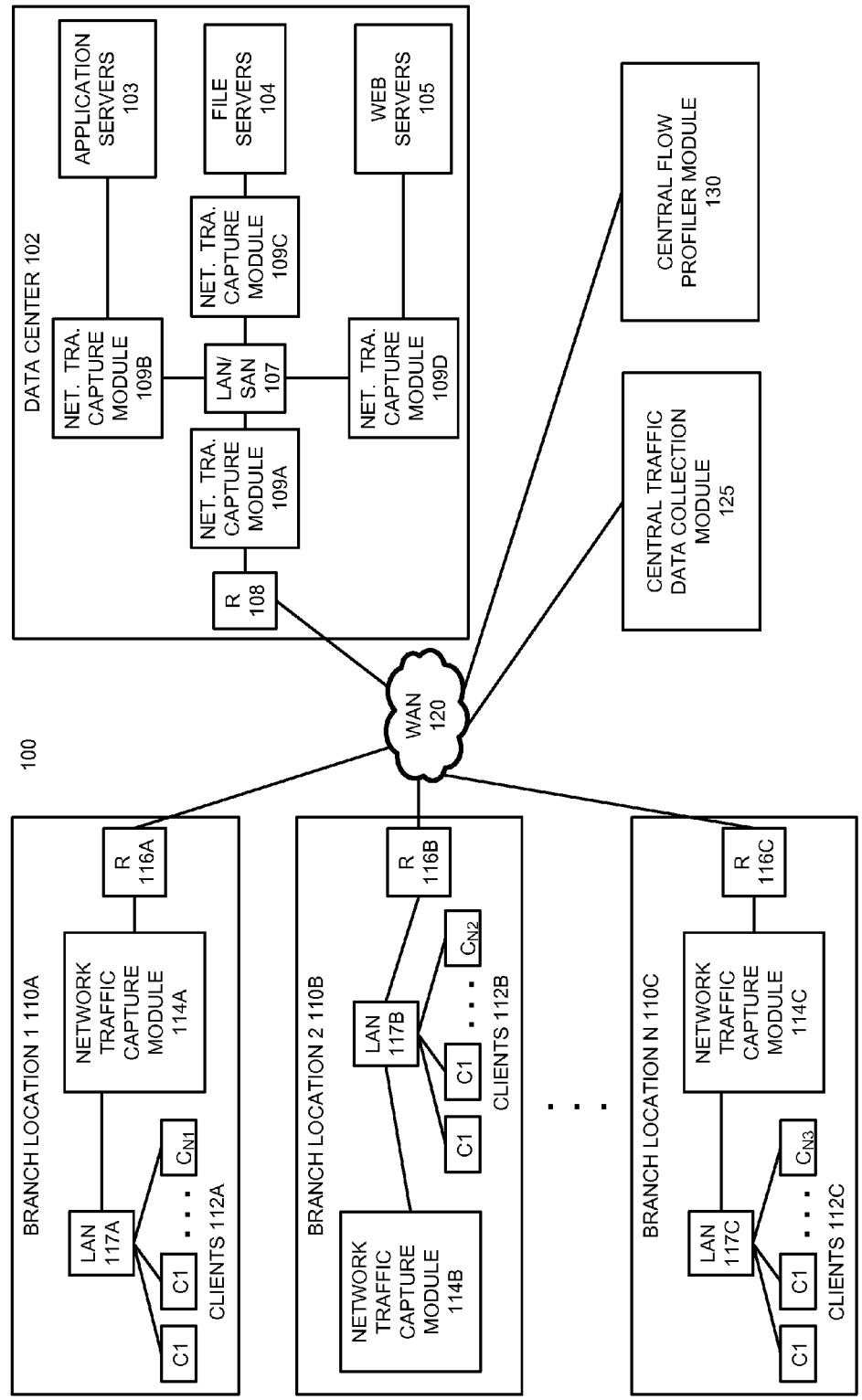
FIGS. 1A-1B illustrate an example system architecture for monitoring and analyzing network traffic information according to an embodiment of the invention.

Embodiments of the invention include systems and methods for integrating a variety of network traffic information from multiple sources, at multiple time scales, and at multiple levels of detail to provide users, such as system administrators, with network traffic information in formats that are easier to identify relevant network information.

In an embodiment, the network monitoring system classifies network performance data into four different categories, each with a different amount of detail and different time resolution. Packet network traffic is the lowest level of network performance data and includes detailed data about individual network packets. Packet network traffic has a time resolution of milliseconds, microseconds, or nanoseconds. Microflows are sequences of packets from a source to a destination over a time scale of seconds. Network performance data about microflows includes aggregate or statistical attributes of the packets included in microflow, as opposed to detailed information about individual packets. Flows are sets or sequences of packets from a source to a destination over a time scale of minutes. Network performance data about flows includes aggregate or statistical attributes of the packets included in flow, as opposed to detailed information about individual packets. Network performance data about flows can also be generated though aggregate or statistical attributes of the microflows included in flow. Macroflows are sets and/or sequences of flows and have a time resolution on the order of, for example, fifteen minutes. Network performance data about macroflows includes aggregate or statistical attributes of the flows included in macroflow. These categories are provided for the purposes of illustration and other embodiments of the invention may use any arbitrary number of categories corresponding to any desired levels of information detail and time resolution.

In an embodiment, the network monitoring system stores and manipulates low-level network packet traffic data and higher-level network flow information separately to enable efficient scaling of the collection and storage of network performance data. As described in detail below, network packet traffic data is collected, stored, and analyzed at multiple network locations. Low-level packet and microflow traffic data is stored at the collection locations and may be communicated over the network only as needed, conserving network bandwidth.

Instead of communicating all low-level packet and microflow traffic data over the network, the distributed network locations communicate summary and aggregate data identifying network microflow traffic and other attributes of potential interest to central flow collection and analysis modules. The central flow collection and analysis modules combine data received from multiple network locations to provide an end-to-end description of network traffic at coarser time scales, such a network traffic flows and macroflows.

In an embodiment, a network monitoring system provides top-down visibility of network performance data. System administrators or other users can "zoom-in" or "drill down" on high-level network performance data, such as network and application health, to one or more intermediate levels of network performance data, such as network flow statistics and trends, and further to low-level network performance data, such as captured network packets. When a user selects specific high-level network performance data of interest, such as a macroflow or flow, an embodiment of the network monitoring system retrieves corresponding low-level network performance data, such as packet and microflow traffic, from the appropriate distributed network monitoring locations to provide additional detailed information about the area of interest.

Figure 1B:
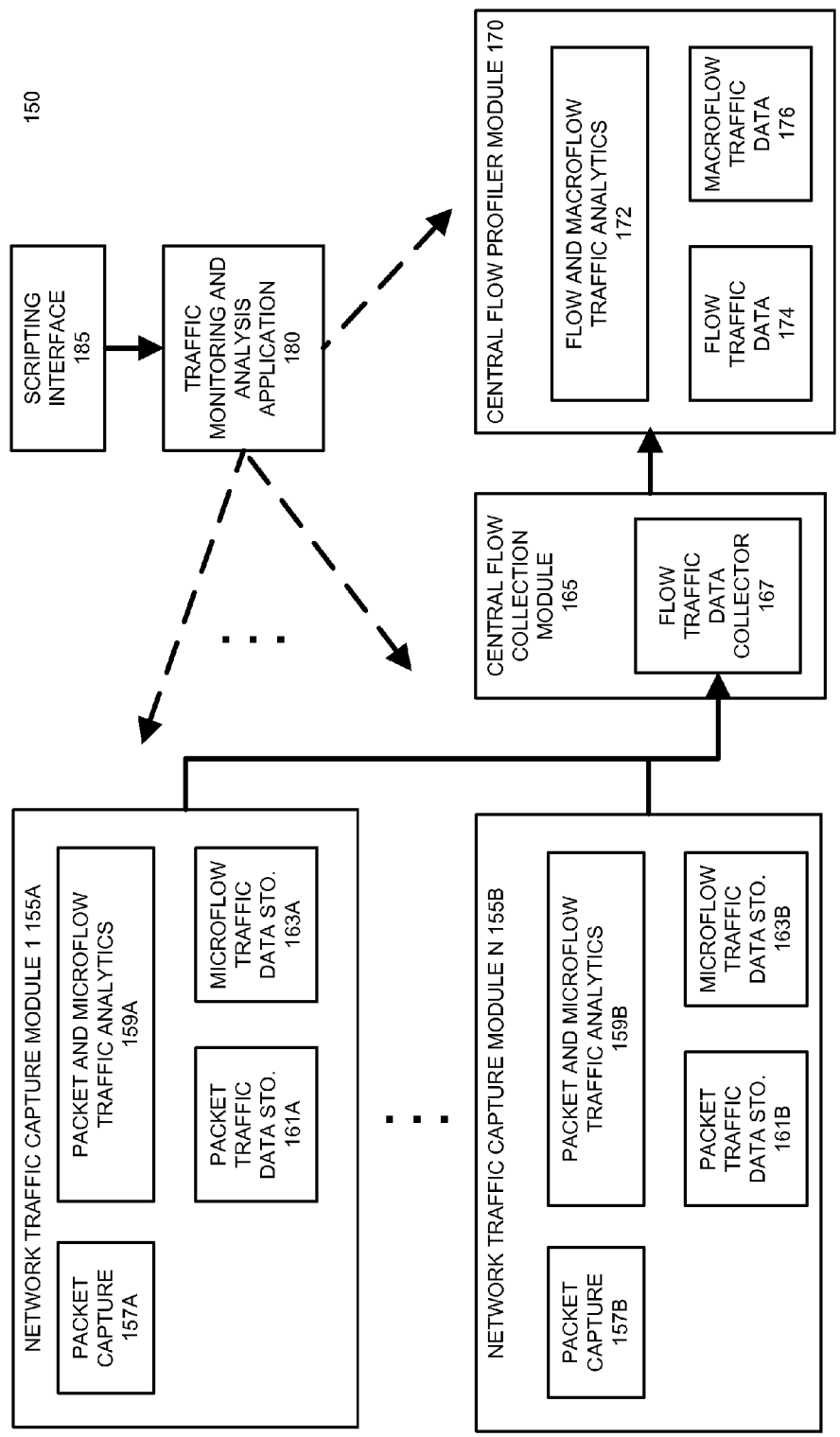

FIGS. 1A-1B illustrate an example system architecture for monitoring and analyzing network traffic information according to an embodiment of the invention. FIG. 1A illustrates an example network 100 including an implementation of a network monitoring system according to an embodiment of the invention. Example network 100 includes a data center location 102 and one or more example branch locations 110, such as branch locations 110A, 110B, and 110C. Embodiments of the invention may implement a network monitoring system in any arbitrary number of branch locations 110. The data center 102 and branch locations 110 are connected by at least one wide area network (WAN) 120, which may be the internet or another type of WAN, such as a private WAN.

Branch locations 110 each include any arbitrary number of client systems 112, such as client systems 112A, 112B, and 112C. Client systems 112 may include user computers, server computers, or other communication devices. Client systems 112 communicate with each other, with any other network devices at that branch location 110, and with WAN 120 (via routers 116) via branch location LANs 117, such as branch location LANs 117A, 117B, and 117C. Branch location LANs 117 may include any combination of wired and wireless network devices including Ethernet connections of various speeds, network switches, gateways, bridges, load balancers, wireless access points, and firewalls and network address translation devices.

Additionally, each branch location 110 includes one or more network traffic capture modules 114, such network traffic capture modules 114A, 114B, and 114C. Each network traffic capture module is adapted to intercept network packet traffic and to record attributes of these packets for performance monitoring and analysis. Following the interception of network packets and the recording of their attributes of interest, network traffic capture modules 114 may forward these network packets on towards their intended destinations.

Embodiments of the network traffic capture modules 114 may be connected to branch location LANs 117 using in-line or out-of-path configurations. For example, network traffic capture module 114A is connected in-line between the branch location LAN 117A and router 116A. Conversely, network traffic capture module 114B is connected with branch LAN 117B in an out-of-path configuration, such as through a router span port or a tap device installed between branch LAN 117B and router 116B.

Example attributes recorded by network traffic capture modules includes source and destination network addresses; the time of interception; packet and packet payload sizes; the network protocol; protocol-specific attributes such as the message type (such as a TCP SYN message), sequence and acknowledgement numbers, flags or other indicators; window sizes and scaling factors; error correction and checksum values; packet headers and footers; optional metadata embedded into packets; layer 3 and 4 information such as time-to-live (TTL), packet drops, round-trip-times, and fragmentation information; and/or layer7 information found inside reconstructed packet payloads, such as application identifiers and URLs.

Additionally, embodiments of the network traffic capture modules may analyze packets to derive additional attributes to be used for network performance analysis. For example, a derived attribute may be a hash, checksum, list of segmentation boundaries, or other type of data fingerprinting of packet payloads. In another example, network traffic capture modules may group related packets (such as those having the same source and destination) into microflows. In a further embodiment, the network traffic capture modules may derive additional attributes summarizing the activities of microflows, such as the source and destination addresses, protocols used, application identifiers, and/or URLs accessed. Additionally, the network traffic capture module may derive statistical measurements of microflows, such as the average, maximum, minimum, and variance of one or more attributes of the microflow and/or of packets included in the microflow. Microflow performance data may be stored by network traffic capture modules in conjunction with references to the performance data for their corresponding packets to assist in the retrieval of more detailed information as needed.

Each of the network traffic capture modules 114 may store detailed packet attributes for use in performance monitoring and analysis. In an embodiment, the network traffic capture modules 114 store detailed packet attributes for intercepted network packets at their respective network locations. As described in detail below, an embodiment of the network traffic capture modules 114 analyze the detailed packet attributes of intercepted packets to identify microflows and other summary and aggregate information. This summary and aggregate information is communicated to a central flow collection module 125 for storage. Because summary and aggregate information is communicated over the network for all of the intercepted packet traffic, rather than the complete detailed packet attributes for all of the intercepted packet traffic, the network bandwidth required for network performance monitoring and analysis is substantially reduced.

Similarly, data center location 102 includes one or more types of server computers, such as one or more application servers 103, file servers 104, and web servers 105. Servers 103, 104, and 105 are connected via data center LAN and/or storage area network (SAN) 107, which may include any combination of wired and wireless network devices including Ethernet and SAN connections of various speeds, network switches, gateways, bridges, load balancers, wireless access points, and firewalls and network address translation devices, and one or more routers 108 for connecting with WAN 120.

Additionally, data center location 102 may include one or more network traffic capture modules 109, such as network traffic capture modules 109A, 109B, 109C, and 109D. Network traffic capture modules 109 may be installed to capture network traffic between entities of interest, such as to and from servers of different. Network traffic capture modules 114, like modules 109, intercepted network packet traffic and record attributes of interest, and then send the intercepted network packets towards their intended destinations.

Embodiments of network traffic capture modules 109 and 114 may be implemented as standalone network devices; as part of other network devices, such as WAN optimization devices; as software applications executing on network devices and/or computer systems; and/or as virtual machine applications executed by network devices and/or computer systems.

Embodiments of the network traffic capture modules 109 and 114 may be located in-path between clients, servers, and network devices of interest to users or alternatively out-of-path. In an out-of-path configuration, network devices are configured to forward a copy of some or all of the packet traffic passing through a network location to a network traffic capture module.

Like network traffic capture modules 114, network traffic capture modules 109 store detailed packet attributes for intercepted network packets at their respective network locations. An embodiment of the network traffic capture modules 109 analyze the detailed packet attributes of intercepted packets to identify microflows and other summary and aggregate information. This summary and aggregate information is communicated to a central flow collection module 125 for storage. Because summary and aggregate information is communicated over the network for all of the intercepted packet traffic, rather than the complete detailed packet attributes for all of the intercepted packet traffic, the network bandwidth required for network performance monitoring and analysis is substantially reduced.

Additionally, central flow profiler module 130 analyzes the summary and aggregate network traffic data provided to central flow collection module to identify related network traffic as it travels through multiple locations over the example networks of system 100. For example, central flow profiler module 130 may identify network flows by cross-referencing flow data intercepted at different network locations that have the same source and destination and other attributes and sequence these according to their times of interception. Central flow profiler module 130 may further identify network macroflows using similar analysis of network flows. Central flow profiler module 130 may also determine additional summary or aggregate attributes of flows and macroflows based on the microflow attributes. Macroflow and flow performance data may be centrally stored in conjunction with references to location of the corresponding flows and microflows, respectively, to assist in the retrieval of more detailed information as needed. In the latter case, the references to microflow performance data may include references to stored data at one or more distributed network traffic capture modules.

In an embodiment, the central flow profiler module 130 may provide and/or interface with one or more network monitoring and performance applications to provide users and applications with top-down visibility of network performance data. Applications may be implemented using web-based technologies, such as HTML and XML. Similarly, interfaces may use web protocols such as HTTP and REST. Using applications and/or interfaces provided by the central flow profiler module 130, users and applications can view network performance data from a high-level, such as macroflows and flows, and, as needed, focus on one or more intermediate levels of network performance data, such as network flow statistics and trends, and further to low-level network performance data, such as captured network packets. When specific high-level network performance data of interest, such as a macroflow or flow, is selected, an embodiment of the central flow profiling module 130 retrieves corresponding low-level network performance data, such as packet and microflow traffic, from the appropriate distributed network monitoring locations to provide additional detailed information about the area of interest.

In a further embodiment, the network monitoring system may allow for extensions and additional applications through a scripting interface. This can enable features such as UI gadgets, more advanced behavioral analytics, packet dissectors, capture control, reports, system configuration, alarms, network topology applications, and additional packet and flow information. The scripting interface may also enable alarms and behaviors specific to different types of applications and businesses.

FIG. 1B illustrates an example 150 of the data flow in a network monitoring system according to an embodiment of the invention. In example 150, N network traffic capture modules 155, where N is any arbitrary positive integer, intercept and analyze network packet traffic. In an embodiment, each of the network traffic capture modules 155, such as network traffic capture modules 155A and 155B, include a packet capture module 157 adapted to intercept network packet traffic.

Packet capture modules 157 record attributes of intercepted network packet traffic and then may forward the packet traffic on towards its destinations. Example attributes recorded by the packet capture modules 157 include source and destination network addresses; the time of interception; packet and packet payload sizes; the network protocol; protocol-specific attributes such as the message type (such as a TCP SYN message), sequence and acknowledgement numbers, flags or other indicators; window sizes and scaling factors; error correction and checksum values; packet headers and footers; optional metadata embedded into packets; layer 3 and 4 information such as time-to-live (TTL), packet drops, round-trip-times, and fragmentation information; and/or layer7 information found inside reconstructed packet payloads, such as application identifiers and URLs.

Embodiments of the packet capture modules 157 and/or packet and microflow traffic analytics modules 159 may also analyze packet traffic to derive additional attributes to be used for network performance analysis. For example, a derived attribute may be a hash, checksum, list of segmentation boundaries, or other type of data fingerprinting of packet payloads.

In an embodiment, the packet capture modules 157 record packet traffic attributes in packet traffic data storages 161. In an embodiment, each instance of packet traffic data storage, such as 161A and 161B, includes local data storage associated with its respective network traffic capture module. Packet traffic data storages 161 may store packet traffic attributes in any format and using any type of data structure known in the art, such as within databases or log files. In a further embodiment, one or more of the packet traffic data storages 161 utilize a file system specifically optimized to organize chronologically recorded packet traffic attributes. Details of an example file system implementing this embodiment are described below.

In an embodiment, each of the network traffic capture modules 155 include packet and microflow traffic analytics modules 159. Each of the packet and microflow traffic analytics modules 159 may also analyze the recorded packet attributes in their respective local packet traffic data storages 161 to group related packets (such as those having the same source and destination) into microflows. Microflow traffic data may include attributes common to some or all of the network packets in a microflow, such as a common source and/or destination, protocol, and/or associated application. In a further embodiment, each of the packet and microflow traffic analytics modules 159 may derive additional attributes summarizing the activities of microflows, such as the source and destination addresses, the time the microflow was received, protocols used, application identifiers, and/or URLs accessed. Additionally, packet and microflow traffic analytics modules 159 may derive statistical measurements of microflows, such as the average, maximum, minimum, and variance of one or more attributes of the microflow and/or of packets included in the microflow. In an embodiment, each of the packet and microflow traffic analytics modules 159 stores microflow traffic data and attributes in microflow traffic data storage 163. The microflow traffic data and attributes are stored in association with references to the corresponding packet traffic data stored in packet traffic data storage 161 to facilitate access to detailed packet traffic data and attributes, if needed. In a further embodiment, the microflow traffic data storages 163 may include local data storage associated with their respective network traffic capture modules 155.

In a further embodiment, the packet and microflow traffic analytics modules 159 may perform application and/or traffic-specific analysis of specific types of network traffic. For example, the packet and microflow traffic analytics modules 159 may process voice-over-IP (VOIP) network traffic to determine an aggregate quality of service metric value, such as a mean opinion score (MOS) value. In this embodiment, the packet and microflow traffic analytics modules 159 may extract and/or compute arbitrary attributes from network packets conditionally based on attributes of the network traffic, such as the source, destination, protocol, packet metadata, and/or associated application. Attributes extracted or computed by the packet and microflow traffic analytics modules 159 may be stored in association with packet and microflow traffic data and/or passed along with flow and/or macroflow data.

In an additional embodiment, users may select the types of attributes to be extracted and/or computed from network packet traffic. Similarly, an embodiment of the invention enables users to select the type of network packet traffic to be analyzed in this detail by the packet and microflow traffic analytics modules 159. This user configurability enables users to balance performance considerations against the need for detailed network traffic data. In yet a further embodiment, users may define their own attributes to be extracted and/or computed from network packet traffic, microflows, flows, and/or macroflow via script or program code.

In an embodiment, each of the network traffic capture modules 155 and its respective analytics modules 159 generate flow traffic data describing its microflow traffic data on a coarser time scale. For example, if microflows cover time periods on the scale of seconds, then flow traffic data cover time periods associated with flows, such on the scale of minutes. This flow traffic data is referred to as "duplicated" flow traffic data because it represents a portion of an end-to-end network traffic flow. Each flow described by the duplicated flow traffic data includes one or more related microflows. Duplicated flow traffic data may include summary attributes, such as microflows' source and destination addresses and ports, the time the microflow was received, protocols used, application identifiers, and/or URLs accessed, the number and size of the packets included in the microflows. quality of service and/or error metrics such as the number of packets dropped in the flow, and/or any other attributes of microflows or packets; statistical measurements of microflows, such as the average, maximum, minimum, and variance of one or more attributes of the microflow and/or of packets included in the microflow; and/or attributes of packets and/or microflows selected for monitoring.

The network traffic capture modules 155 forward duplicated flow traffic data to a central flow collection module 165. The central flow collection module 165 includes a flow traffic data collector 167 for storing the duplicated flow traffic data from one or more network traffic capture modules 155 in flow traffic data storage 174. In an embodiment, duplicated flow traffic data from two or more network traffic capture modules 155 are stored in the same flow traffic data storage 174. Duplicated flow traffic data stored in flow traffic data storage 174 may include references to their respective associated network traffic capture modules and microflow traffic data to facilitate access to detailed microflow traffic data and attributes, if needed. In an embodiment, flow traffic data storage 174 is included in local storage associated with a central flow profiler module 170.

In a further embodiment, flow and macroflow traffic analytics module 172 analyzes the received duplicated flow traffic data to create an end-to-end representation of network traffic flows. These end-to-end representations of network traffic flows are referred to as "connected" flow traffic data. For example, each of the network traffic capture modules 155 collects packet traffic data at a different network location. Using the duplicated flow traffic data collected and derived from these different locations, the flow and macroflow traffic analytics module 172 can identify duplicated flow traffic data from two or more network locations that are part of the same end-to-end network flow. Duplicated flow traffic data collected from different locations and part of the same connected flow may have the same source and destination addresses and ports and/or other attributes and similar time values. Other information, such as routing information, may be used to determine the sequence of duplicated flow traffic data from different network location in the end-to-end network connection. In a further embodiment, the contents of network packets or a derived attribute of these contents, such as a hash, checksum, list of segmentation boundaries, or other type of data fingerprinting, may be used to identify duplicated flows that are part of the same end-to-end network connection or a related network connection. In an embodiment, end-to-end connected network flow traffic data is also stored in flow traffic data storage 174. In a further embodiment, the end-to-end connected network flow traffic data is stored in conjunction with references to the associated network traffic capture modules and their respective packet and microflow traffic data storages to assist in the retrieval of more detailed network traffic data associated with connected network traffic flows.

In an embodiment, flow and macroflow traffic analytics module 172 also analyzes the connected flow traffic data to generate macroflow traffic data, representing sets of end-to-end network flows over a coarser time scale, for example around fifteen minutes. Macroflow traffic data may include sequences of connected network flows from the same source and/or the same destination. For example, macroflow traffic data may include all of the connected network flows that start, end, and/or pass through a given point in a network. This macroflow information may used to monitor and analyze the performance of a specific client, server, or network device. Macroflow traffic data may also aggregate connected network flows according to attributes such as an application, protocol, or service type, such as e-mail services, database services, VOIP services. Macroflow traffic data is stored in macroflow traffic data storage 176 with references to their respective associated network traffic flow data to facilitate access to detailed flow traffic data and attributes, if needed.

In an embodiment, macroflow traffic data may include one or more summary attributes describing aspects of the aggregated connected network flows. The flow and macroflow traffic analytics modules 172 may use predefined and/or user-defined criteria to specify how these summary attributes are determined. In an additional embodiment, macroflow summary attributes may measure network performance in quantitative metrics, such as a quality of service score, and/or qualitative metrics, for example representing "normal operation," "possibly anomalous operation," and "abnormal or faulty operation."

Users and applications may access packet, microflow, flow, and macroflow traffic data from their respective sources through one or more network traffic monitoring and analysis applications 180. Network traffic monitoring and analysis applications 180 may access network traffic data via one or more application programming interfaces. In a further embodiments, the application programming interface may use web-based protocols such as HTTP and SOAP, data formats such as, XML and JSON, and API principles like representative state transfer (REST) for exchanging network traffic data.

Embodiments of the network traffic monitoring and analysis applications 180 may include command-line and graphical user interfaces to present network traffic data and receive input from users. Network traffic monitoring and analysis applications 180 may present network traffic data in the form of tables, lists, graphs, charts, and flow and packet sequence diagrams. Network traffic monitoring and analysis applications 180 may include functions for searching and filtering network traffic data according to criteria specified by users or other applications. Network traffic monitoring and analysis applications 180 may also export network traffic data formats in human and/or machine-readable formats for further analysis.

In an embodiment, the network traffic monitoring and analysis applications 180 enable users to view related network traffic data at a variety of different time scales and different levels of detail to monitor and analyze network performance. For example, the network traffic monitoring and analysis applications 180 may present users with a macroflow view of network traffic data. From this view, a user may identify a macroflow of interest. For example, a network traffic monitoring and analysis application 180 may indicate that one of the macroflows associated with a specific service is experiencing occasional delays in response times. In this example, upon selecting this macroflow interest, the network traffic monitoring and analysis application 180 retrieves and presents more detailed network flow data corresponding with the selected macroflow. For example, the network traffic monitoring and analysis application 180 may present a chart or graph of the connected flow's response time over the past few days.

Once a user has identified a portion of one or more connected network traffic flows of interest, the network traffic monitoring and analysis applications 180 may retrieve corresponding microflow information from the appropriate microflow traffic data storages 163 in one or more of the network traffic capture modules 155 and present this information to the user. For example, a user may select the network traffic flows in a time range of a few minutes for further analysis. The network traffic monitoring and analysis applications 180 will then retrieve the microflow traffic data associated with this flow within this time range and present it to the user. Similarly, the user may then select one or more packets of interest within a microflow for further examination. The network traffic monitoring and analysis applications 180 then retrieves the corresponding packet traffic data from the appropriate packet traffic data storages 161 in one or more of the network traffic capture modules 155 for presentation to the user.

In addition to one or more network traffic monitoring and analysis applications 180, an embodiment of the invention may also include a scripting language interface 185 enabling scripts or applications to access and process network traffic data at all available levels of detail. The scripting language interface 185 can be used to add features and functionality within existing network traffic monitoring and analysis applications 180, to interface and/or integrate other applications with the central flow profiler module 170, and also to create new standalone applications. Example usages enabled by the scripting language interface 185 include behavioral analytics within network traffic monitoring and analysis applications 180; widgets; packet dissectors; customized network performance reporting; network configuration applications; network topology analysis; and network performance alarms. Embodiments of scripting language interface 185 may utilize any programming or scripting language known in the art, including Javascript, Python, and Perl, as well as bytecode compilers and interpreters for supporting additional programming and scripting languages.

Figure 2A:
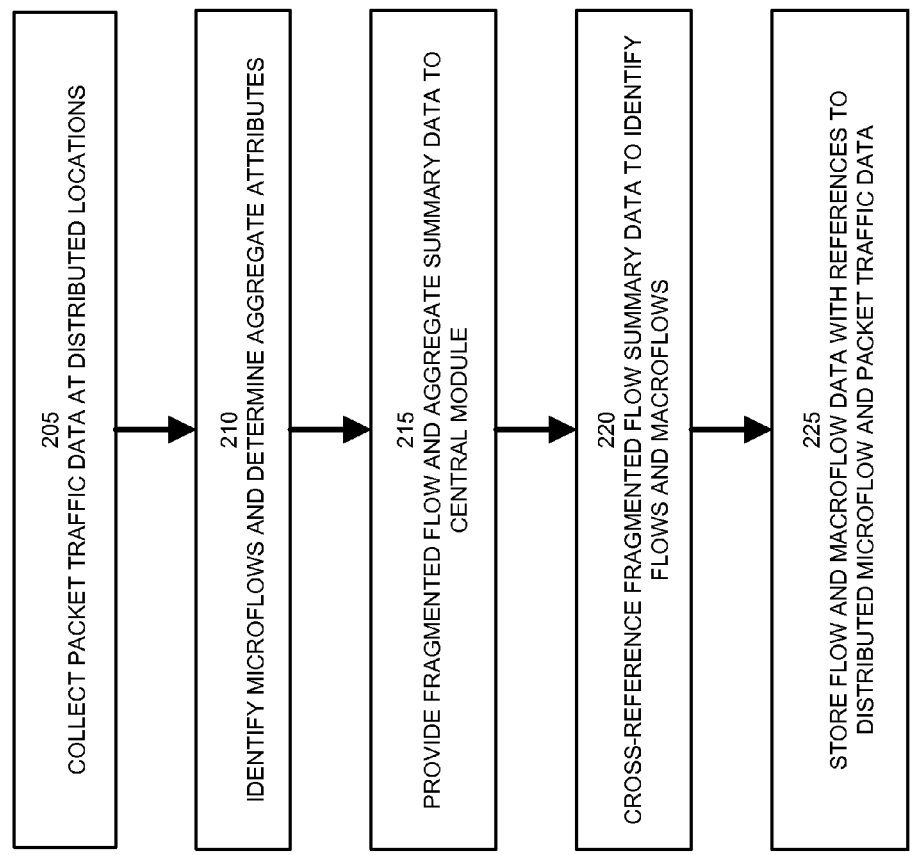
FIGS. 2A-2B illustrate methods for collecting, aggregating, and retrieving distributed network traffic data.
Figure 2B:
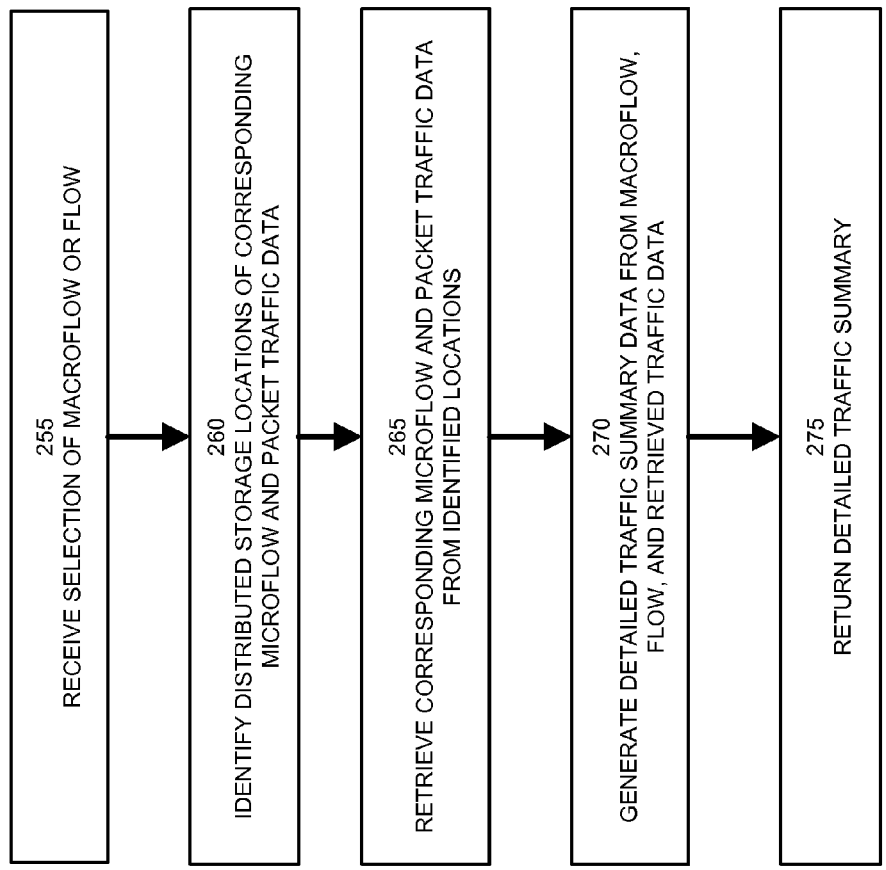

FIGS. 2A-2B illustrate methods for collecting, aggregating, and retrieving distributed network traffic data. FIG. 2A illustrates a method 200 for collecting and aggregating distributed network data according to an embodiment of the invention.

Step 205 collects packet traffic data at distributed locations, for example using network traffic capture modules. In an embodiment, packet traffic may be collected by intercepting network packets on route to their destinations, recording attributes of these packets, and then forwarding the intercepted packets on to their destinations. As described above, example attributes recorded by step 205 may include source and destination network addresses; the time of interception; packet and packet payload sizes; the network protocol; protocol-specific attributes such as the message type (such as a TCP SYN message), sequence and acknowledgement numbers, flags or other indicators; window sizes and scaling factors; error correction and checksum values; packet headers and footers; optional metadata embedded into packets; layer 3 and 4 information such as time-to-live (TTL), packet drops, round-trip-times, and fragmentation information; and/or layer7 information found inside reconstructed packet payloads, such as application identifiers and URLs. In a further embodiment, step 205 analyzes packet contents and/or packet traffic attributes to derive additional attributes to be used for network performance analysis, such as data fingerprints.

Step 210 analyzes packet traffic data to group related packets (such as those having the same source and destination) into microflows. In a further embodiment, step 210 may derive additional attributes summarizing the activities of microflows, including statistical measurements of microflows, such as the average, maximum, minimum, and variance of one or more attributes of the microflow and/or of packets included in the microflow. In yet a further embodiment, step 210 may analyze packet traffic data selected by users or user-defined criteria, for example to provide in-depth analysis of specific types of network traffic. In an additional embodiment, step 210 may analyze packet traffic data to determine user-defined attributes.

Step 215 provides duplicated flow traffic data and optionally aggregate packet or microflow data to one or more central modules for collection and analysis. In an embodiment, the duplicated flow traffic data and any aggregate packet or microflow data is provided from one or more network traffic capture modules at different network locations to central flow collection and/or central flow profiler modules for analysis and storage.

Step 220 cross-references the received duplicated flow traffic data to create connected flow traffic data representing network traffic flows from end-to-end. Embodiments of step 220 may cross-reference attributes of duplicated flow traffic data collected using source and destination addresses and ports, similar time values, routing information, and/or the contents of network packets or a derived attribute of these contents.

In an embodiment, step 220 analyzes the connected flow traffic data to generate macroflow traffic data. Macroflow traffic data may represent attributes of connected network traffic flows over longer time scales, such as 15 minutes. Embodiments of step 220 may generate macroflow traffic data by aggregating connected network flows according to attributes such as an application, protocol, or service type.

In an embodiment, step 220 may determine aggregate attributes of connected flow and/or macroflow traffic data for the uses such as performance monitoring and analysis. Step 220 may use predefined and/or user-defined criteria to determine these aggregate attributes. Step 220 may also determine quantitative and/or qualitative metrics of these flows and macroflows.

Step 225 stores the connected flow and macroflow traffic data. In an embodiment, macroflow and flow traffic data is stored in data storage with references to their respective associated network traffic flows and microflows to facilitate access to detailed traffic data and attributes, if needed.

FIG. 2B illustrates a method 250 for retrieving distributed network data according to an embodiment of the invention. Step 225 receives a selection of at least one macroflow or flow. Embodiments of step 225 may receive the selection from a user via an application or from a script or other application via an interface, such as an application programming interface or a web services interface.

In response to receiving the selection of at least one macroflow or flow, step 260 identifies one or more distributed storage locations of corresponding microflow and/or packet traffic data. In an embodiment, macroflow and flow traffic data is stored in a central storage location with references to one or more distributed storage locations storing the corresponding microflow and/or packet traffic data. In a further embodiment, these distributed storage locations may also be the network locations where network packet traffic data is collected via network traffic capture modules.

An embodiment of step 260 accesses the central macroflow and/or flow traffic data to identify macroflow and/or flow traffic data corresponding with the selection of step 255. Step 260 then accesses the references associated with this traffic data to identify one or more distributed storage locations for the related microflow and/or packet traffic data. Each reference may include the network location including distributed traffic data, such as a network address of a network traffic capture module, and at least one storage location within each storage device, such as a storage or memory address, file path, database key or other record identifier, or other type of index into a data structure.

Step 265 retrieves microflow and/or packet traffic data corresponding with the selection of one or more macroflow and/or flows from step 255. Because each macroflow and/or connected flow describes network traffic as it passes through multiple locations over one or more networks, an embodiment of step 265 may retrieve microflow and/or packet traffic data from one or more distributed network locations, such as the network locations of one or more network traffic capture modules.

Step 270 generates detailed network traffic summary data from the macroflow and flow traffic data and the traffic data retrieved in step 265, such as microflow and/or packet traffic data. In an embodiment, step 270 uses the macroflow and/or flow traffic data to organize the corresponding microflow and/or packet traffic data into detailed network traffic summary data. For example, step 270 may use connected flow traffic data to organize the microflow traffic data retrieved from two or more network locations, thereby creating an end-to-end representation of microflow traffic. Similarly, step 270 may use the flow traffic data and/or retrieved microflow traffic data to organize the packet traffic data retrieved from two or more network locations, thereby creating an end-to-end representation of network packet traffic. In a further embodiment, a user, application, and/or script may specify the type of representation to be generated by step 270. For example, a user, application, and/or script may specify a subset of network traffic data of interest or how the network traffic data should be organized in the detailed network traffic summary data.

Step 275 returns the detailed traffic summary data to the user, application, and/or script. In an embodiment, the detailed traffic summary data may be returned by the same application programming interface used to receive the selection in step 255. In another embodiment, step 275 may output the detailed traffic summary data via another interface or in the form of a data file. Step 275 may utilize web-based protocols and formats, such as HTTP and XML, for returning the detailed traffic summary data.

As described above, embodiments of the invention may cross-reference duplicated flow traffic data to create combined network flow data representing network flows from their sources to their destinations. However, some types of network traffic may generate a cascade of related network traffic that does not necessarily travel between the same source and destination.

For example, a network packet requesting a web page may be received by load balancer. The load balancer then directs the web page request to one of a set of web servers. If the web page includes dynamic content, this web server may create and send one or more related packets to one or more application servers to retrieve and/or generate additional data. Each application server may create and send one or more additional packets to database servers, other application servers, and/or data storage systems.

In this example, a single packet from a client to a web server results in a cascade of related network packet traffic between load balancers, web servers, application servers, database servers, and data storage systems, as well as any other devices on the network, such as network switches, WAN optimization devices, proxies, and firewalls. The network traffic that triggers this cascade of additional network traffic between other entities is referred to as triggering network traffic. The network traffic generated in response to the triggering network traffic, which is not directed between the same source and destination as the triggering network traffic, is referred to as related network traffic. To assist users and applications with monitoring and analyzing network performance, an embodiment of the invention identifies related network traffic and cross-references it with its triggering network traffic.

Figure 3:
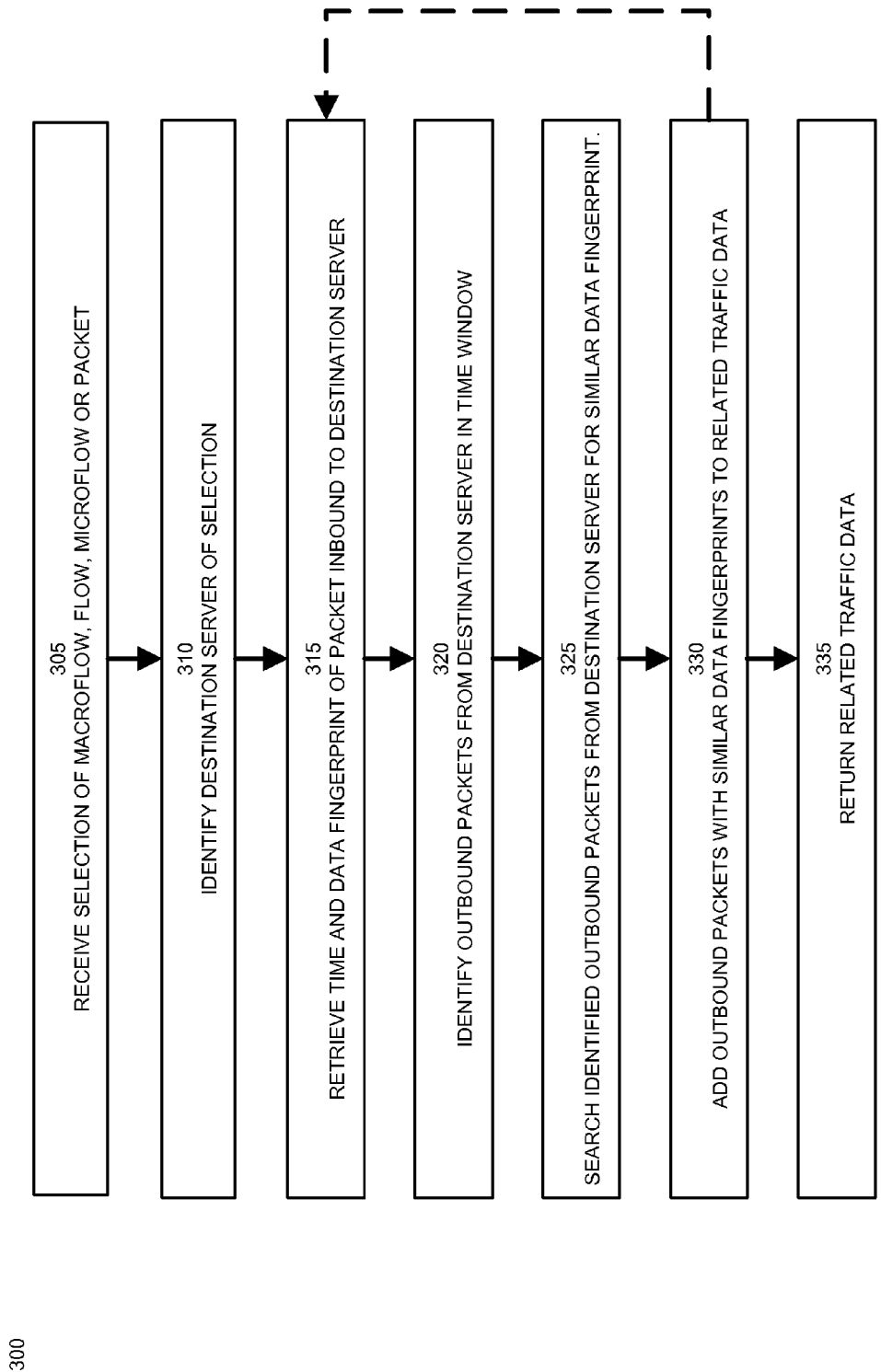
FIG. 3 illustrates a method of identifying related network traffic according to an embodiment of the invention.

FIG. 3 illustrates a method 300 of identifying related network traffic according to an embodiment of the invention. Step 305 receives a selection of one or more macroflows, connected or duplicated flows, microflows, and/or packets from a user or application.

For each macroflow, flow, microflow, and/or packet included in the selection, step 310 identifies the destination server for the selected network traffic. In an embodiment, step 310 identifies the destination server using the destination network address associated with the selected network traffic.

Step 315 retrieves the time and a data fingerprint of one or more network packets associated with the selected network traffic. In an embodiment, if the selected network traffic includes a macroflow, connected or duplicated flow, and/or a microflow, then step 315 first identifies one or more network packets associated with the selected network traffic. This may be done, for example, using method 250 described above.

Once one or more network packets associated with the selected network traffic are identified, step 315 retrieves the time of interception at or near the destination server for these associated network packets. In an embodiment, these and other attributes of the network packets may be retrieved from distributed packet traffic data storages.

Additionally, step 315 retrieves data fingerprints previously derived and stored for these network packets at the time of their interception. The data fingerprints are derived at least in part from the contents of the network packets' payload or data contents. Example data fingerprints may include a hash, checksum, and/or a list of segmentation boundaries of the network packet payloads. Data fingerprints may be determined for all or subsets of packet payloads. For example, step 315 may segment a packet payload according to a deterministic segmentation algorithm and then determine separate hashes or checksums for each segment of the packet payload.

Step 320 identifies outbound network packets from the destination server in a time window based on the interception time(s) determined in step 315. For example, step 320 may search distributed packet traffic data storages for network packets originating at the destination server and having an interception time at or near this network location within a time window, such as one second, of the interception time of inbound network packets. In an embodiment, these outbound network packets may be directed to destinations other than the sources or destinations of the selected network traffic.

Step 325 searches the attributes of the identified outbound network packets for similar or the same data fingerprints as that retrieved for inbound network packets in step 315. In an embodiment, step 325 retrieves data fingerprint attributes from distributed traffic packet storages for the identified outbound network packets. Step 325 compares the data fingerprint attributes of the outbound network packets with those of the inbound network packets. Outbound data packets with the same or similar data fingerprints as that found in the selected inbound network traffic are likely to have been triggered by this inbound network traffic.

An embodiment of step 330 adds any outbound network packets with the same or similar data fingerprints as the inbound network traffic to a related network traffic data set. In an embodiment, step 330 may also search distributed and central microflow, flow, and macroflow traffic data storages for microflows, flows, and/or macroflows including these matching outbound network packets and add these microflows, flows, and/or macroflows to the related network traffic data set.

Step 335 returns the related network traffic set to the requesting user or application for further review or analysis.

In an embodiment, steps 315 to 330 may be repeated using newly identified related outbound network traffic from a first destination server as inbound network traffic to one or more additional destination servers. For example, steps 315 to 330 may be applied recursively to identify further network traffic that is triggered by outbound network traffic from a first destination server.

Figure 4:
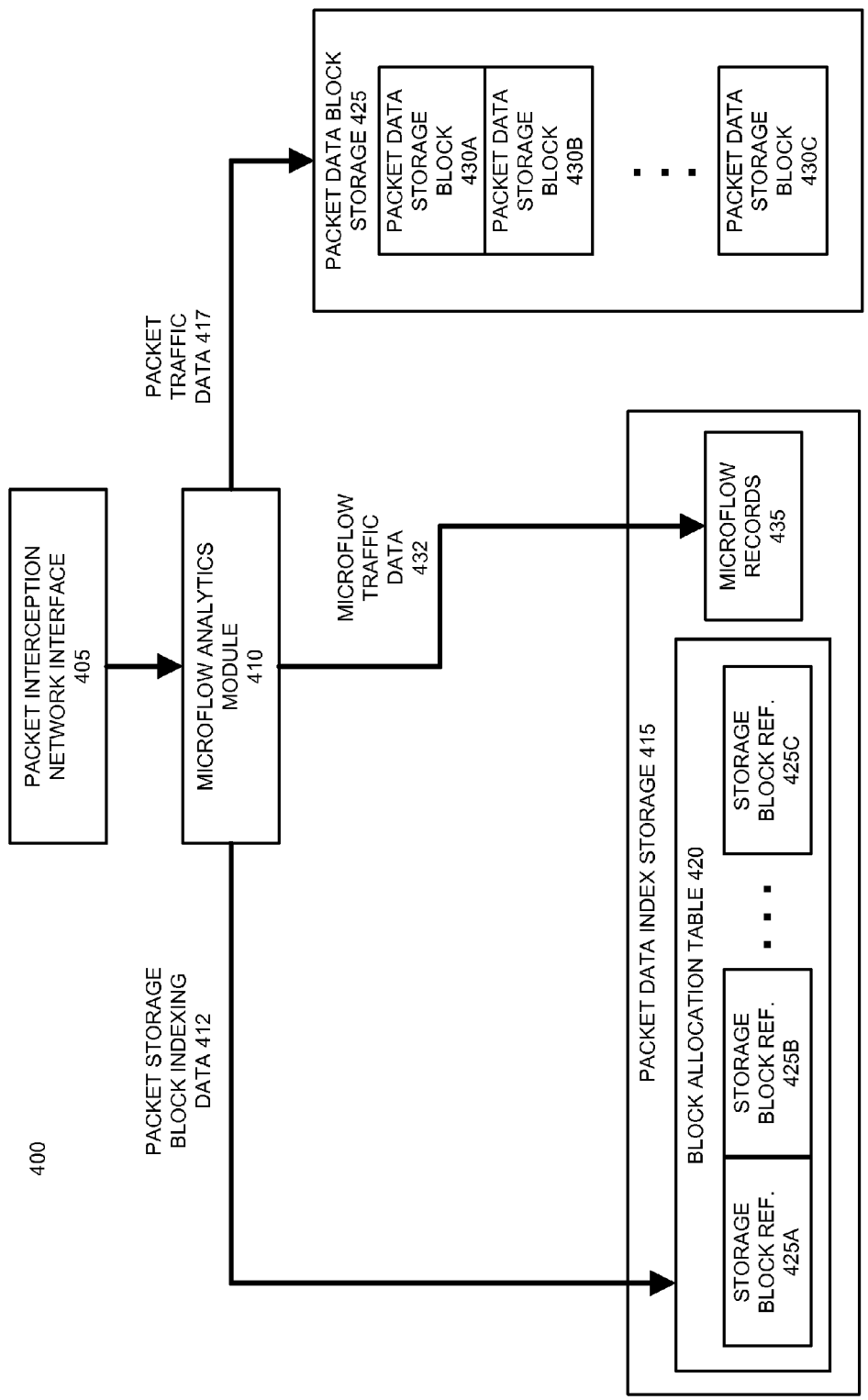
FIG. 4 illustrates an example file system for storing packet and microflow traffic data according to an embodiment of the invention.

FIG. 4 illustrates an example file system and packet interception architecture 400 for storing packet and microflow traffic data according to an embodiment of the invention. Example architecture 400 includes a packet interception network interface 405 adapted to intercept and forward network traffic. Packet interception network interface 405 may include one or more physical network interfaces, such as one or more gigabit Ethernet interfaces.

Packet interception network interface 405 is adapted to copy all or a portion of the intercepted network traffic and then forward this traffic on to its destination. In an embodiment, intercepted network traffic data, such as network packet headers and/or packet payloads from intercepted network traffic, is provided to microflow analytics module 410. Microflow analytics module 410 groups related packets, such as those having the same source and destination, over a relatively short time frame, such as seconds, into microflows. In a further embodiment, the microflow analytics module 410 may derive additional attributes summarizing the attributes and activities of microflows, such as the source and destination addresses, the time the microflow was received, protocols used, application identifiers, and/or URLs accessed; statistical measurements of microflows, such as the average, maximum, minimum, and variance of one or more attributes of the microflow and/or of packets included in the microflow; and/or user-defined or user-enabled attributes or metrics, such as quality-of-service metrics for general or specific types of network traffic.

Microflow analytics module 410 outputs packet traffic data 417, such as packet headers and any derived packet traffic attributes to packet data block reference storage device 425 for storage. Packet data block storage device 425 may include one or more physical data storage devices configured to act as a single logical storage device or multiple logical storage devices, such as a RAID array.

In an embodiment, the packet data block reference storage device 425 includes a file system adapted to organize packet traffic data. In typical prior file systems, node data structures, such as inodes, are used to store information about a regular file, directory, or other file system object. In prior systems, node data structures organize data into directories and files. A directory node includes pointers or references to one or more file nodes and/or other directory nodes. A file node may include one or more pointers or addresses to data blocks including the file data. Both file and directory node data structures may optionally include pointers or addresses of additional node data structures to represent large files or directories.

In contrast with prior file systems, an embodiment of the system 400 includes a file system adapted to organize packet traffic data. Packet data block reference storage 425 includes a plurality of packet data storage blocks 430. Each of the packet data storage blocks 430 is adapted to store packet traffic data for a large number of packets. For example, each of the packet data storage blocks 430 may be sized in the hundreds of megabytes, allowing it to store packet traffic data for millions or more packets. In an embodiment, microflow analytics module 410 writes packet traffic data 417 to packet data storage blocks 430 in sequential order based at least approximately on the order in which packets are intercepted. This maximizes write throughput by using sequential data writes to minimize disk access time.

An embodiment of system 400 utilizes a block allocation table data structure 420 to index and enable efficient access to packet traffic data stored in the packet data storage blocks. In this embodiment, the block allocation table 420 includes a plurality of storage block references 425. Each of the storage block references 425 includes a index, address, pointer, or other reference to one of the packet data storage blocks 430. For example, storage block references 425A, 425B, and 425C provide references to packet data storage blocks 430A, 430B, and 430C, respectively. Packet data block reference storage 425 may include any arbitrary positive integer number of packet data storage blocks 430. Similarly, block allocation table 420 may include the same arbitrary positive integer number of corresponding storage block references 425. In an embodiment, the block allocation table 420 is stored packet data index storage device 415 separate from the packet data block reference storage device 425 to avoid interrupting the write throughput of packet traffic data.

Additionally, each of the storage block references 425 includes metadata to identify the range of packet traffic data stored in its corresponding packet data storage block. This metadata may include the time stamps for the earliest and/or latest packets stored in the packet data storage block and the total number of packets stored in the packet data storage block. By accessing the metadata in the storage block references 425, applications can quickly identify one or more of the packet data storage blocks 430 including packet traffic data of interest.

Additionally, data storage device may include one or more microflow records 435 to store microflow traffic data 432. Microflow records 435 may include references, pointers, or addresses to one or more of the packet data storage blocks 430 associated with their corresponding packet traffic data. Embodiments of the microflow records 435 may be stored on the same storage device as the block allocation table 420 or the packet data storage blocks 430, or on a separate data storage device.

In an embodiment, microflow records 430 may be used to optimize searches for relevant packet traffic data. For example, if a user or application is searching for packet traffic data for a flow within a time period, the flow traffic data may be accessed to identify one or more microflows associated with this flow and within the time period of interest. The microflow records corresponding with these identified microflows can be accessed to identify one or more packet data storage blocks including the relevant packet traffic data. The user or application only needs to search the packet data storage blocks identified by the microflow records, rather than large log files or other data structures, to retrieve the relevant packet traffic data.

Figure 5:
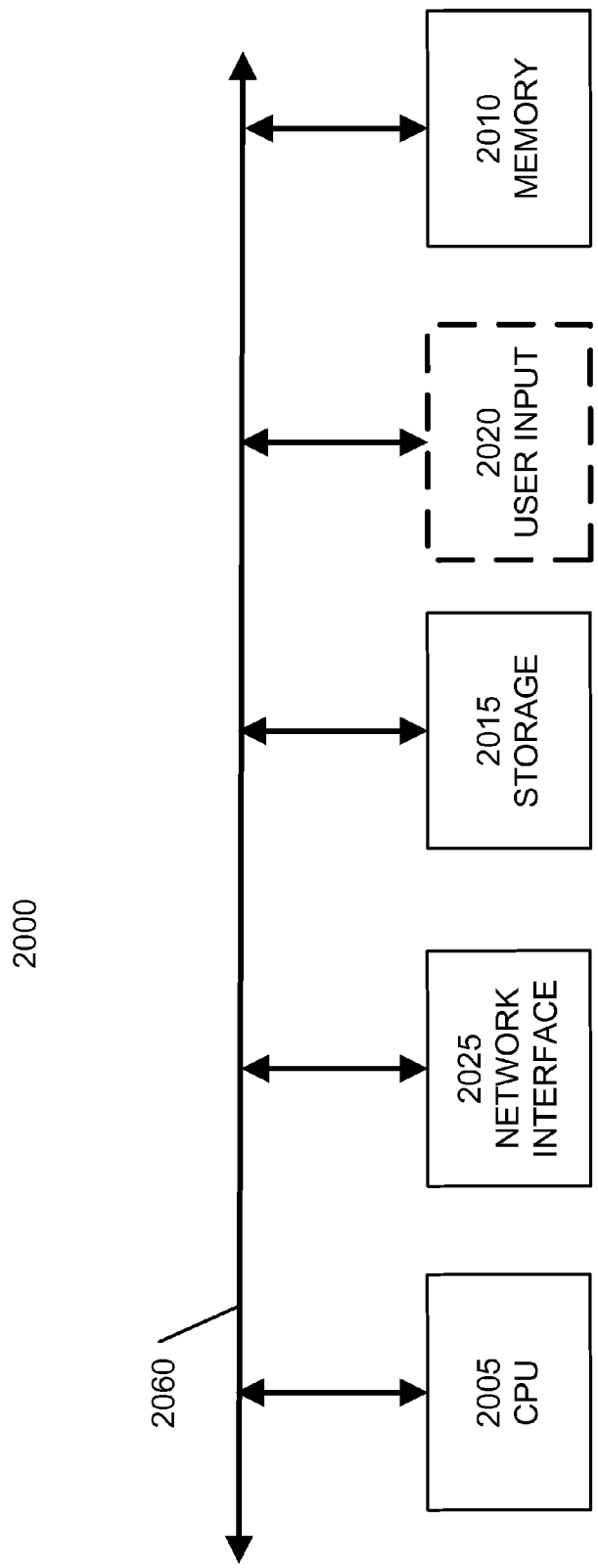
FIG. 5 illustrates an example computer system suitable for implementing embodiments of the invention.

FIG. 5 illustrates an example computer system suitable for implementing embodiments of the invention. FIG. 5 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for monitoring network performance, the system comprising:
   first and second network packet capture modules at first and second respective network locations, wherein each of the network packet capture modules is adapted to intercept network traffic at its network location and store first network traffic data at a first time scale;
   a central network traffic data flow module at a third network location, wherein the central network traffic data flow module is adapted to receive and store first summary network traffic data from the first and second network packet capture modules, wherein the first summary network traffic data is at a second time scale coarser than the first time scale; and
   wherein the central network traffic data flow module is further adapted to identify related network traffic data from the first and second network locations from the first summary network traffic data and to store references to the related network traffic data, wherein the related network traffic data is stored at the first time scale in the first and second network locations.

2. The system of claim 1, wherein the first summary network traffic data includes first references to corresponding portions of the first network traffic data at the first time scale, wherein the central network traffic data flow module is adapted to retrieve at least one of the portions of the first network traffic data from at least one of the first and second network packet capture modules using the first references included in the first summary network traffic data.

3. The system of claim 2, wherein the central network traffic data flow module is adapted to retrieve the at least one of the portions of the first network traffic data in response to a selection of a portion of the first summary network traffic data.

4. The system of claim 3, wherein the selection is received via a network monitoring application.

5. The system of claim 1, wherein the related network traffic is included in a network flow between a first source and first destination.

6. The system of claim 5, wherein the related network traffic is included in a related network flow to at least a second destination.

7. The system of claim 1, wherein the central network traffic data flow module is adapted to store flow traffic data derived from the first summary network traffic data.

8. The system of claim 1, wherein the central network traffic data flow module is adapted to store macroflow traffic data derived from the first summary network traffic data.

9. The system of claim 1, wherein the first summary network traffic data includes an attribute common to at least a portion of the first network traffic data.

10. The system of claim 1, wherein the first summary network traffic data includes an aggregate attribute of at least a portion of the first network traffic data.

11. The system of claim 1, wherein the first summary network traffic data includes a statistical attribute determined from at least a portion of the first network traffic data.

12. The system of claim 1, wherein the first summary network traffic data includes a user-configured attribute of at least a portion of the first network traffic data.

13. The system of claim 12, wherein the user-configured attribute is determined by executing user-provided code.

14. The system of claim 1, wherein the first and second network packet capture modules store first and second portions of the first network traffic data on first and second storage devices at the first and second network locations, respectively.

15. The system of claim 14, wherein the first storage device stores the first portion of the first network traffic data using a file system including packet data block references, wherein each packet data block reference represents a time period and includes at least one reference to a data block including a subset of the first portion of the first network traffic data intercepted within the time period.

16. The system of claim 1, wherein the central network traffic data flow module stores first summary network traffic data on a storage device at the third network location.

17. The system of claim 1, wherein at least one of the first and second network packet capture modules and/or the central network traffic data flow module is implemented at least partially within a virtual machine application.

18. The system of claim 1, wherein at least one of the first and second network packet capture modules and/or the central network traffic data flow module is implemented at least partially within a network monitoring appliance.

19. The system of claim 1, wherein the central network traffic data flow module includes an application programming interface for communicating with network management applications.

20. The system of claim 1, wherein the central network traffic data flow module includes a scripting interface for communicating with network management applications.

\* \* \* \* \*